United States Patent
De Groot et al.

(10) Patent No.: US 6,183,531 B1
(45) Date of Patent: Feb. 6, 2001

(54) MINERAL WOOL PLANT SUBSTRATE

(75) Inventors: Jacob Frank De Groot, Roermond; Albert Willem Knop, Horn; Paul Jacques Louis Hubert Bouwens, Maastricht, all of (NL)

(73) Assignee: Rockwool/Grodan B.V., Melick-Herkenbosch (NL)

( * ) Notice: Under 35 U.S.C. 154(b), the term of this patent shall be extended for 0 days.

(21) Appl. No.: 09/068,473

(22) PCT Filed: Nov. 11, 1996

(86) PCT No.: PCT/EP96/04996

§ 371 Date: Sep. 25, 1998

§ 102(e) Date: Sep. 25, 1998

(87) PCT Pub. No.: WO97/16961

PCT Pub. Date: May 15, 1997

(30) Foreign Application Priority Data

Nov. 10, 1995 (EP) .................................................. 95203061

(51) Int. Cl.[7] ........................... A01G 31/00; C05F 11/02; A01N 25/00
(52) U.S. Cl. ...................... 71/24; 47/59; 47/64; 71/64.03
(58) Field of Search .............................. 47/59, 64; 71/24, 71/64.03

(56) References Cited

U.S. PATENT DOCUMENTS 2,192,939 * 3/1940 Slayter et al. .............................. 47/1
5,218,783 * 6/1993 Langezaal et al. ....................... 47/64
5,471,786 * 12/1995 Clausen ................................... 47/59

FOREIGN PATENT DOCUMENTS

| 5227833 | * | 9/1993 | (JP) . |
| 5244824 | * | 9/1993 | (JP) ................. A01G/7/00 |
| 9108662 | | 6/1991 | (WO) . |
| 9300797 | | 1/1993 | (WO) . |
| 9318642 | | 9/1993 | (WO) . |

OTHER PUBLICATIONS

Wever, G. et al., "Measuring Mechanical Properties of Growing Media and the Influence of Cucumber Cultivation on These Properties", Acta Horticulturae, p27–34, 1995.*

Ishimaru, A. "Granulation and Firing of Waste Rock Wool for Effective Utilization", Kenkyu Hokoku, p.85–86, 1994.*

Grove, D. et al., "Potting Orchids; the Properties of Potting Materials for Orchids", The Knoll, p496–505, 1998.*

Contrisciano, T. et al., "Growth of Bedding Plants and Poinsettias in Mineral Wool and Mineral Wool/Peat Substrates", Community Soil Science Plant Analysis, p.485–501, 1995.*

* cited by examiner

Primary Examiner—Gary P. Straub
(74) Attorney, Agent, or Firm—Webb Ziesenheim Logsdon Orkin & Hanson, P.C.

(57) ABSTRACT

Mineral wool plant substrate formed of a coherent matrix of mineral wool having 99.9 to 75 wt % mineral wool and 0.1 to 25 wt % of an organic substance. Clay may be included in the matrix. The matrix may be in the form of a pellet.

3 Claims, No Drawings

MINERAL WOOL PLANT SUBSTRATE

BACKGROUND OF THE INVENTION

1. Field of the Invention

The present invention relates to a mineral wool plant substrate, more in particular to a mineral wool plant substrate comprising a foreign material in order to improve the properties of the mineral wool plant substrate.

2. Description of the Prior Art

Mineral wool plant substrates for plant growth are well-known in the art and consist of a coherent matrix of mineral wool. This coherent matrix is formed by collecting a layer of mineral wool fibres provided with a curable binder, so that after curing the mineral wool fibres are substantially not displacable relative to one another. If required for fast uptake of water this coherent matrix of mineral wool may be provided with a wetting agent.

As mineral wool may be used glass wool, stone wool, rock wool, or slag wool, and/or mixtures thereof.

The fibres may have an average diameter varying in between 1–10 $\mu$m. For rock wool, the fibre diameter is on average about 4 $\mu$m.

The density of the coherent matrix of mineral wool may be between 10–200 kg/m$^3$, in general in between 30–80 kg/m$^3$.

Such a coherent matrix of mineral wool has a form retaining property which is inherent due to the inorganic starting materials used therein. Furthermore, the water retaining capacity of these mineral wool plant substrates is very well controllable and predictable.

A disadvantage may be that during the plant growth, initially the matrix reacts basic so that the pH increases.

It is a desire of growers to alleviate the aforementioned disadvantage, but above that to have the possibility of controlling the exchange of nutrient cations.

Such properties are inherent to organic substances such as sphagnum and peat. However, these materials are unsuitable for use in mineral wool plant substrates because during culture they lose structure, and due to biological degradation of the organic substance, the water retaining capacity changes such that less air is included within the material resulting in acidification of the plant substrate.

SUMMARY OF THE INVENTION

The present invention provides a mineral wool plant substrate that combines the beneficial properties of both mineral wool and organic substances while avoiding substantially the disadvantages of these two materials.

According to the present invention is provided a mineral wool plant substrate comprising a coherent matrix of mineral wool, with 99.9 to 75 wt % mineral wool and 0.1 to 25 wt % organic substance.

DETAILED DESCRIPTION OF THE INVENTION

The present invention includes a mineral wool plant substrate comprising a coherent matrix of mineral wool, with 99.9 to 75 wt % mineral wool and 0.1 to 25 wt % organic substance.

By including up to less than 25 wt % organic substance in a coherent matrix of mineral wool, the degradation of the organic substance substantially the structure and the water retaining capacity as well as acidification are avoided. In addition, due to the presence of the organic substance, the pH decrease is overcome due to the buffering property of the organic substance.

In order to avoid substantially the effect of biological degradation of the organic substance it is preferred that the substrate comprises 99.5 to 90 wt % mineral wool and 0.5 to 10 wt % organic substance, preferably 99.5 to 95 wt % mineral wool and 0.5 to 5 wt % organic substance.

Suitable organic substances are sphagnum and pressed peat as substantially biological non-degradable organic substances, and peat as such as a biological degrading organic substance. Using biologically degrading organic substances, the mineral wool plant substrate provides further advantageous properties linked to the organic substance, namely the provision of a carbon source. Further, due to the degradation of the organic substance, growth hormones, humic acids and vitamins are relaased which are beneficial to plant growth. Chelate forming compounds are also released which keep slight or insoluble trace elements in the nutrient solution. Accordingly, the plant growth is optimally promoted.

It is emphasized that due to the use of peat the cation exchange capacity is optimally improved.

When it is desired to provide a mineral wool plant substrate having properties in between mineral wool and organic substance, it is worthwhile to partially substitute the organic substance by an inorganic substance such as a natural clay. This clay does not provide a carbon source or growth hormones and chelate compounds but provides an intermediate cation exchange capacity. Accordingly, clay may substitute the organic substance for up to 99 %, generally for up to 50%, preferably for up to 25%. This means that clay may be present in amounts between 0.01 to 9.9 wt %, generally in between 0.2–3%, such as 0.2–1 wt %.

Clay for substitution of the organic substance may comprise soil materials comprising hydrophilic particles suitable soil materials have a particle size below 20 pm, belonging to the class of eroded minerals, such as clays, mixtures of clays with silt and sand having a clay fraction removable as sludge of at least 20%, and further bentonite, kaolin and the like. Particularly suitable are different naturally occuring types of clays of mixtures thereof, such as young see clay. Examples are clays comprising 0–100%, preferably 10–50%, most preferably particles smaller than 20 $\mu$m.

The use of clay provides another advantage when the organic substance is included in the matrix in the form of a pellet. Clay functions as a lubricating agent and as a material that reduces the compressability of the pellet. Accordingly, the amount of clay may be used in order to change the biodegradable character of the organic substance. Accordingly, peat which is normally biodegradable may be change partially to substantially nonbiodegradable due to the addition of clay to the pellet. Accordingly, clay may inhibit or retard the biodegradation of the organic substance. The pellet may have a pellet size of about 2–10 mm.

Due to the presence of clay and of peat the concentration of spore elements in the water residing within the mineral wool matrix may be controlled, due to the sustained release of the cations temporarily stored within the organic substance and/or clay.

Examples of the mineral wool plant substrates according to the invention are the following.

Coherent matrices of mineral wool are provided having a density of about 50 kg/m$^3$ and an average fibre diameter of 4 $\mu$m. During the production of these plant substrates organic substance in the form of peat is added during the formation of the matrix of mineral wool prior to binder curing. After passing through a curing oven a coherent matrix is obtained.

Plant substrates according to the invention have been prepared comprising 5, 10 and 20 wt % peate, the remainder being mineral wool.

Other mineral wool plant substrates have been prepared comprising 15 wt % peat, 5 wt % clay and 80 wt % mineral wool.

Another plant substrate made according to the invention comprised 1 wt % sphagnum, 4 wt % clay and 95 wt % mineral wool.

The plant substrates have been used in the growth of plants and have shown an optimal control of the pH buffering, a sustained release of trace elements and of the water distribution. During culturing, the biodegration of peat and sphagnum resulted in a growth of mineral organisms providing growth promoting compounds to the plants.

What is claimed is:

1. A mineral wool plant substrate formed of a coherent matrix of mineral wool, consisting of 99.9 to 75 wt % mineral wool and 0.1 to 25 wt % of a mixture of an organic substance and clay, wherein said organic substance is selected from the group consisting of sphagnum and peat, wherein said clay comprises from 0.1 to 9.9 wt % of said matrix and said clay comprises up to 50 wt % of said mixture, and wherein said matrix has a density of 10 to 200 $kg/m^3$.

2. The substrate, as claimed in claim 1, wherein said mineral wool is present at 99.5 to 90 wt % and said mixture is present at 0.5 to 10 wt %.

3. The substrate as claimed in claim 2, wherein the organic substance and the clay are included in the matrix in the form of a pellet.

* * * * *

UNITED STATES PATENT AND TRADEMARK OFFICE
CERTIFICATE OF CORRECTION

PATENT NO.    : 6,183,531 B1
DATED         : February 6, 2001
INVENTOR(S)   : Jacob Frank DeGroot et al.

It is certified that error appears in the above-identified patent and that said Letters Patent is hereby corrected as shown below:

Title page,
Item [*] Notice, insert -- This patent issued on a continued prosecution application filed under CFR 1.53(d), and is subject to the twenty year patent term provisions of 35 U.S.C. 154(a)(2). --

Column 2,
Line 17, "relaased" should read -- released --.
Line 36, "particles suitable" should read -- particles. Suitable --.

Column 3,
Line 5, "peate" should read -- peat --.

Signed and Sealed this

Tenth Day of August, 2004

JON W. DUDAS
*Acting Director of the United States Patent and Trademark Office*